Figure 1:
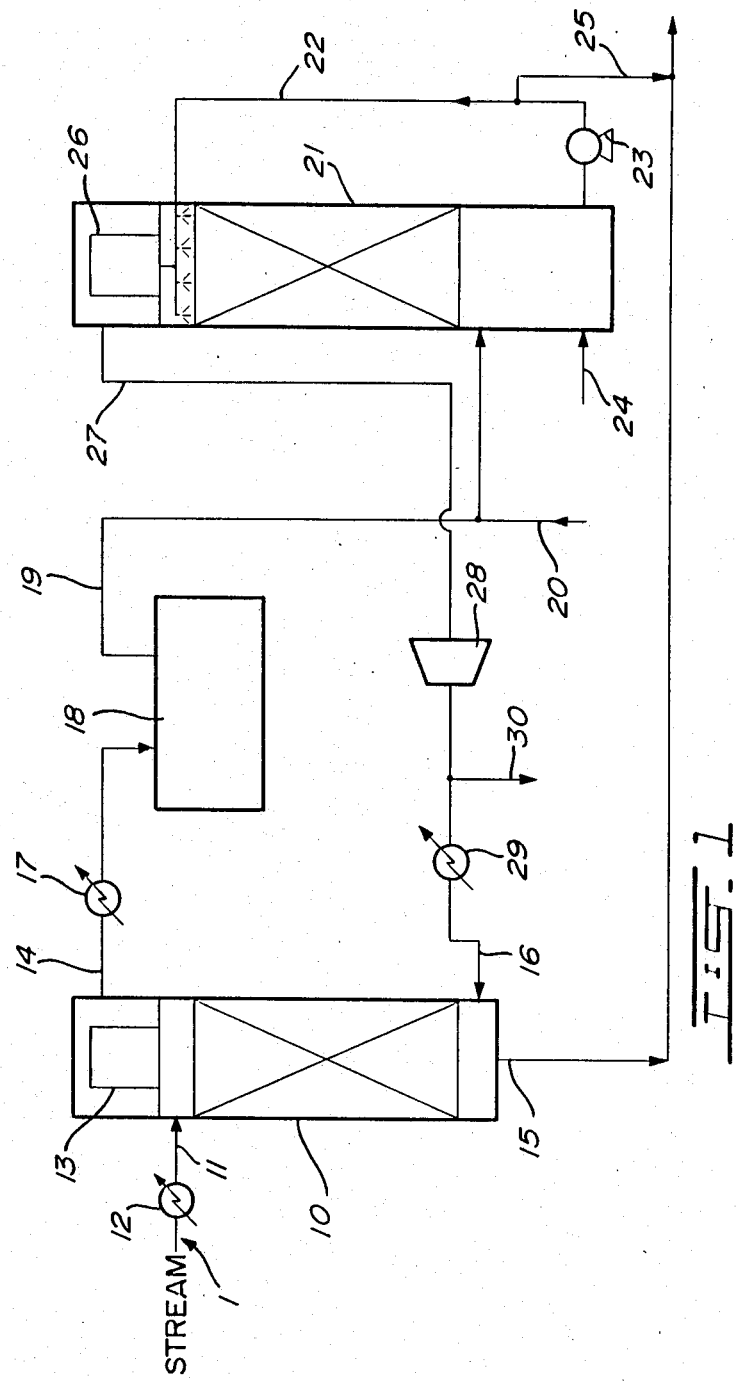

United States Patent [19]

Cameron et al.

[11] Patent Number: 4,663,142
[45] Date of Patent: May 5, 1987

[54] GENERATION OF SULPHUR TRIOXIDE FROM OLEUM

[75] Inventors: Gordon M. Cameron, North York; Robert F. Whitters, West Hill, both of Canada

[73] Assignee: C-I-L Inc., North York, Canada

[21] Appl. No.: 799,794

[22] Filed: Nov. 21, 1985

[30] Foreign Application Priority Data

Jan. 21, 1985 [CA] Canada .................................. 472524

[51] Int. Cl.$^4$ ....................... C01B 17/76; C07B 45/02
[52] U.S. Cl. .................................... 423/532; 423/522; 260/686
[58] Field of Search ................ 423/522, 532; 260/686

[56] References Cited

U.S. PATENT DOCUMENTS

| | | | |
|---|---|---|---|
| 1,498,168 | 6/1924 | Hill ..................................... | 423/522 |
| 1,605,004 | 11/1926 | Shapleigh ........................... | 423/522 |
| 2,407,822 | 9/1946 | Fahnestock et al. ............... | 423/532 |
| 3,296,096 | 1/1967 | Portman et al. .................... | 423/532 |
| 3,853,502 | 12/1974 | Dörr et al. ........................... | 423/522 |

OTHER PUBLICATIONS

Kirk–Othmer, Encyclopedia of Chemical Technology, vol. 22, 3rd edition, Wiley and Sons, New York, 1983, pp. 28;29.

Primary Examiner—John Doll
Assistant Examiner—Robert M. Kunemund
Attorney, Agent, or Firm—C. Brian Barlow

[57] ABSTRACT

A continuous process for the generation of sulphur trioxide from oleum suitable for use in the sulphonation of organic compounds which comprises continuously introducing oleum feed to a sulphur trioxide desorption tower; continuously introducing a recycled dry feed air stream to said desorption tower, whereby a gaseous mixture of sulphur trioxide in air is produced; collecting spent oleum from said desorption tower; introducing said gaseous mixture to a sulphonation reactor; and recycling spent gaseous mixture from said reactor to said desorption tower as said feed air stream. The process offers reduced environmental pollution and operating costs.

5 Claims, 1 Drawing Figure

GENERATION OF SULPHUR TRIOXIDE FROM OLEUM

This invention relates to processes and apparatus for the generation of sulphur trioxide from oleum and, more particularly, to the use of such sulphur trioxide in the sulphonation of organic compounds.

Sulphonation of organic compounds is generally carried out by using gaseous mixtures of dry air containing 3-6% sulphur trioxide sparged into a reactor containing an anhydrous liquid system containing the organic compound. A slight excess of sulphur trioxide is generally used which requires that the effluent gases be scrubbed downstream of the sulphonation reactor.

In one known system, the sulphur trioxide gas used in the sulphonation reaction is provided 'on-site' by the burning of dry sulphur in dry air to produce sulphur dioxide which is converted to sulphur trioxide in a mini sulphuric acid plant converter. The effluent gas from the sulphonation reactor is passed to an absorber to remove residual sulphur trioxide and then vented to atmosphere. This system, however, suffers from the serious drawbacks of being capital intensive in that many items of expensive and complicated equipment are involved, is difficult to start-up and shut-down, and is not very flexible in terms of gas flow and sulphur trioxide gas strength.

Alternative systems are known which utilize oleum as a source of sulphur trioxide gas. In one such alternative, oleum feed containing 35-40% free sulphur trioxide is heated in a boiler to provide pure sulphur trioxide which is then fed in air to a sulphonation reactor. The spent oleum generally contains 20-25% sulphur trioxide and is returned to the supplier for fortification. While this latter system avoids the 'on-site' handling of elemental sulphur and its combustion to sulphur dioxide and subsequent oxidation to sulphur trioxide, the air drying and effluent gas scrubbing operations are complicated and expensive. Further, as only a relatively small amount of the sulphur trioxide in the oleum feed is utilized for sulphonation the throughput of oleum is significant.

A variation on such an oleum feed system is known wherein dry air is passed through the oleum to facilitate sulphur trioxide stripping of the oleum by mass transfer. Such a process allows of an easier and greater sulphur trioxide desorption than does the mere heating of the oleum. However, in all such systems, drying of all feed air and the fume scrubbing of effluent gas is carried out by traditional means with subsequent venting to atmosphere.

Fume scrubbing as generally practised involves the use of aqueous solutions of alkaline materials such as caustic soda, soda ash, lime and the like. While this approach may reduce fumes to environmentally acceptable levels it produces a wet acidic gas which is not readily usable for other purposes. In addition, aside from the lack of utility of the effluent gas, the alkaline scrubbing materials are relatively expensive, are difficult to control, and produce a liquid effluent which can itself constitute a disposal problem.

The drying of all feed air used to effect sulphur trioxide stripping of the oleum is essential in order to prevent product of sulphuric acid in the sulphur trioxide/air gaseous mixture. Silica gel or similar solid drying systems are generally used in sulphonation systems wherein the silica gel is in packed beds and with subsequent gas switching from bed to bed. Silica gel regeneration is effected by hot air stripping while the bed is off-line. Such drying systems have serious disadvantages in that the regeneration process involves high energy requirements, the drying columns have pressure drops while the continuous bed switching frequently results in air leakage and resultant inadequate drying.

The present invention has as a principle object the provision of a simple sulphonation system dependent upon oleum as a source of sulphur trioxide gas which offers a high removal of sulphur trioxide from the oleum feed with a resultant saving in energy and corrosion costs.

As another object, the invention provides a more environmentally acceptable sulphonation process with the generation of sulphur trioxide from oleum by lower temperature purging with a recycling stream of dry air.

Thus, the invention provides a process wherein as an essential feature the effluent gas from the sulphonation reactor is recycled back to the desorption tower so as to constitute all, or a major part of the recycling stream of dry air.

Accordingly, the invention provides in its broadest aspect a continuous process for the generation of sulphur trioxide suitable for use in the sulphonation of organic compounds which comprises (a) continuously introducing oleum feed to a sulphur trioxide desorption tower;
(b) continuously introducing a recycled dry feed air stream to said desorption tower, whereby a gaseous mixture of sulphur trioxide in air is produced;
(c) collecting spent oleum from said desorption tower;
(d) introducing said gaseous mixture to a sulphonation reactor; and
(e) recycling spent gaseous mixture from said reactor to said desorption tower as said feed air stream of step (b).

In a preferred feature the effluent gas is scrubbed in order to provide a dry sulphur trioxide-free gas suitable for either recycle through any compressor that may be in that part of the system, or venting to atmosphere.

Accordingly, in a preferred feature, the invention provides a process as hereinbefore defined further comprising the step of removing substantially all of the sulphur trioxide present, if any, in the spent gaseous mixture prior to the recycling of said spent gaseous mixture to said desorption tower.

A preferred scrubber of use in the preferred process of the invention involves the recycling of substantially azeotropic sulphuric acid (97-100%). Such a scrubbing system offers the advantage of simultaneously removing both unreacted sulphur trioxide and any water vapour present in consequence of admitting any 'top-up' air to the system. Recycling sulphuric acid of such strength is also useful in producing acid suitable for combination with the spent oleum to be returned to the supplier. Thus, not only is a potential pollutant eliminated but it is made use of commercially. Typically, the scrubber comprises a packed column fitted with an acid distribution unit and a mist eliminator designed to give high efficiency droplet collection even for submicron particles.

The temperature of the oleum in the desorption tower in the process according to the invention may be as low as 50°-70° C. This should be contrasted with typical temperatures of the order of 120°-150° C. for systems which require oleum boiling. Thus, it can be seen that the present process offers both reduced heating costs and reduced corrosion.

A further advantage of the present process is that air purging of the oleum feed allows spent oleum strengths to be lowered to the order of 10% sulphur trioxide, as against 20-25% sulphur trioxide remaining in the typical oleum boiling process. This clearly reduces the amount of oleum shipped, used and re-fortified and results in significant transportation cost savings. Air purging is also more adaptable to the use of reduced strength oleum feed as there is significant room to raise oleum temperatures to compensate.

In order that the invention may be better understood, a preferred embodiment according to the invention will now be described, by way of example only, with reference to the accompanying FIGURE which shows a schematic diagram of the apparatus and process of the present invention. The apparatus shown is capable of delivering 80 Kg/hr. sulphur trioxide to the sulphonation reactor.

Referring to the FIGURE, wherein is shown a sulphur trioxide desorption tower, a sulphonation reactor, a scrubber and auxiliary equipment, the FIGURE shows a sulphur trioxide desorption tower 10 provided at an upper part with an oleum feed line 11, oleum pre-heater 12, a high-efficiency sulphuric acid mist eliminator 13 and a gaseous stream exit line 14. At a lower part tower 10 is provided with an oleum exit pipe 15 and a feed air inlet pipe 16. Tower 10 is typically filled with a ceramic packing supported by a ceramic support (not shown) through which gas or air and oleum can percolate to produce a full and intimate contact therebetween.

Line 14 is connected through heat exchanger 17 to a sulphonation reactor 18. Reactor 18 is provided with gas-sparging means (not shown) and has a spent gaseous stream exit pipe 19 connected to a 'top-up' air line 20 and the base of a fume scrubber 21.

Scrubber 21 forms part of a sulphuric acid recycling system also comprising loop 22, a circulating pump 23, water inlet pipe 24 and acid exit pipe 25. Scrubber 21 is typically filled with ceramic packing (not shown) through which gas or air and sulphuric acid can percolate to produce intimate contact, therebetween, as for the desorption tower 10. At its upper part, scrubber 21 is provided with a mist eliminator 26 from which leads a pipe 27 connected, in turn, to a compressor 28 and heat exchanger 29. Pipe 27 is joined to a bleed-off pipe 30 between compressor 28 and exchanger 29. Connected to exchanger 29 is feed air pipe 16, whereby the closed air circulating cycle of the apparatus is completed.

In operation, stream 1 constituting a rich oleum feed (37.5% sulphur trioxide) enters tower 10 through line 11 at a rate of 262 Kg/hr. Typically, the oleum contains 35-40% free sulphur trioxide but oleum containing as low as 25% free sulphur trioxide may be used. To facilitate sulphur trioxide desorption in tower 10, the oleum is pre-heated by heater 12 to 60° C. The desirability of the heater 12 is dependent on a number of factors, including, but not limited to, oleum feed strength, spent oleum strength, desired sulphur trioxide gaseous stream strength, discharge pressure, and the like.

The oleum percolates through the tower packing in countercurrent contact with rising hot, dry air (150° C.) which enters the tower 10 through pipe 16 at a rate of 451 Kg/hr., whereby free sulphur trioxide in the oleum is purged out to produce spent oleum (10% sulphur trioxide; 180 Kg/hr.; 60° C.) which leaves the tower 10 through pipe 15 for collection and fortification. The gaseous stream of sulphur trioxide in air (6.0% v/v sulphur trioxide; 531.5 Kg/hr.; 60° C.) flows through the high efficiency mist eliminator 13 and heat exchanger 17 to yield a cooled dry gaseous stream (30° C.) which is introduced to the sulphonation reactor 18 containing the organic compound to be sulphonated under the required conditions for sulphonation to be effected.

Generally, the amount of sulphur trioxide entering reactor 18 is in excess and, accordingly, the spent gaseous stream emitted from reactor 18 will contain small amounts of sulphur trioxide. This spent gaseous stream in the embodiment shown flows (0.17% v/v sulphur trioxide; 453.3 Kg/hr.) to fume scrubber 21 when mixed with a small amount of 'top-up' air (24 Kg/hr.) added through line 20. Cold, recirculating sulphuric acid (98.5% $H_2SO_4$; 30° C.) in the fume scrubber 21 absorbs the sulphur trioxide and water vapour from the gaseous stream and allows for a dry sulphur trioxide-free gaseous stream to pass through mist eliminator 26 and compressor 28. The sulphuric acid system of scrubber 21 is circulated by pump 23, with water addition (0.5 Kg/hr.) through pipe 24 and sulphuric acid 'bleed-off' (2.9 Kg/hr.) through pipe 25.

The compressor means 28 is designed to raise the pressure of the sulphur trioxide-free spent gaseous stream to levels sufficient for flow through the upstream equipment. If desired, a small 'bleed-off' stream may be vented through pipe 30 to control the build-up of undesirable constituents such as, for example, sulphur dioxide, while the bulk of the clean, spent gaseous stream is warmed by heat exchanger 29 and passed through pipe 16 into the tower 10.

The selection of oleum feed strength, temperature and flow rate and of the feed air temperature and flow rate can be readily determined and controlled by the person skilled in the art. The desorption tower is able to accept wide and rapid flow variations without much loss in efficiency. A continuous gaseous stream of 2-8% v/v sulphur trioxide in air can readily be obtained from the desorption tower for use in the subsequent sulphonation reaction.

In an alternative embodiment (not shown), the spent gaseous stream from the sulphonation reactor may be recycled back into the desorption tower without being scrubbed sulphur trioxide free. Such a process may still require occasionally a small amount of dry air for 'topping-up' purposes and, accordingly, suitable air drying means.

However, in the preferred embodiment described hereinabove, the fume scrubbing system offers total sulphur trioxide removal, very good and reliable drying of the feed air and, in conjunction with the absorbing acid circulation and high efficiency mist eliminator, offers a sulphur trioxide free dry gas for the compression step. Such a system avoids the typically used silica gel drying operation with its disadvantageous multiple controls, pressure drop, and energy requirements. Total water input to the present process need only be sufficient to produce absorbing acid when combined with the sulphur trioxide from line 19.

An important advantage of the present invention is that the air recycle feature ensures that a minimal gas discharge to atmosphere is maintained. In the case of the embodiment utilizing fume scrubbing, such a gas discharge is sulphur trioxide free. The extent of any purge will be dependent on the build-up of substances, such as sulphur dioxide, which are likely to be present in the inlet oleum and the levels in the discharge that can be tolerated environmentally.

Energy requirements for the process include sufficient compression power and heat to facilitate vaporization of the sulphur trioxide in the oleum desorpiton tower. No energy is required for drying other than the small power requirement of the acid circulation system. Cooling is required for sulphur trioxide gas and, possibly, for the spent oleum.

In a further aspect, the invention provides apparatus comprising units which enable the process of the invention as hereinbefore defined to be carried out.

Accordingly, the invention provides apparatus for the generation of sulphur trioxide from oleum and sulphonation of organic compounds which comprises
(a) a sulphur trioxide desorption tower having oleum feed means and spent oleum exit means, and wherein is generated a gaseous mixture of sulphur trioxide in air;
(b) a sulphonation reactor;
(c) means for conducting said gaseous mixture from said tower to said reactor; and
(d) means for conducting spent gaseous mixture produced in said reactor to said tower, whereby said spent gaseous mixture purges said oleum to re-generate said gaseous mixture.

In a preferred aspect, the invention provides apparatus as hereinbefore defined further comprising scrubbing means whereby any sulphur trioxide in said spent gaseous mixture is removed prior to the transfer of said spent gaseous mixture to said tower.

We claim:

1. A continuous process for the generation and regeneration of sulphur trioxide in the sulphonation of organic compounds comprising:
   (a) continuously introducing oleum feed to a sulphur trioxide desorption tower:
   (b) continuously introducing a recycled dry feed air stream to said desorption tower, whereby a gaseous mixture of sulphur trioxide in air is produced;
   (c) collecting spent oleum from said desorption tower;
   (d) introducing said gaseous mixture to a sulphonation reactor;
   (e) passing spent gaseous mixture from said sulphonation reactor through a scrubber wherein substantially all of any sulphur trioxide in said spent gaseous mixture is removed, said scrubber comprising a packed tower and recirculating sulphuric acid loop through which concentrated sulphuric acid is recycled to effect said removal of said sulphur trioxide to produce a scrubbed spent gaseous mixture; and
   (f) recycling said scrubbed spent gaseous mixture to said desorption tower as said feed air stream of step (b).

2. A process as claimed in claim 1 wherein said concentrated sulphuric acid is 97-100% sulphuric acid.

3. A process as claimed in claim 1 wherein said gaseous mixture comprises 2-8% v/v sulphur trioxide in air.

4. A process as claimed in claim 1 wherein said oleum in said tower is at a temperature selected from the range 50°-70° C.

5. A process as claimed in claim 1 wherein said oleum feed contains 35-40% sulphur trioxide.

* * * * *